United States Patent
Yadav et al.

(10) Patent No.: US 11,057,553 B2
(45) Date of Patent: Jul. 6, 2021

(54) ELECTRONIC DEVICE FOR CAPTURING MEDIA USING A BENDABLE DISPLAY AND METHOD THEREOF

(71) Applicant: Samsung Electronics Co., Ltd., Suwon-si (KR)

(72) Inventors: Sourabh Singh Yadav, Bangalore (IN); Pankaj Kumar Bajpai, Bangalore (IN); Sarvesh, Bangalore (IN); Pranav Prakash Deshpande, Bangalore (IN); Lokesh Rayasandra Boregowda, Bangalore (IN); Rituparna Sarkar, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/503,910

(22) Filed: Jul. 5, 2019

(65) Prior Publication Data
US 2020/0014831 A1    Jan. 9, 2020

(30) Foreign Application Priority Data

Jul. 6, 2018  (IN) .............................. 201841025398
Mar. 19, 2019  (IN) .............................. 201841025398
Jun. 18, 2019  (KR) ........................ 10-2019-0072492

(51) Int. Cl.
*H04N 5/225*    (2006.01)
*H04N 7/14*    (2006.01)
*H04M 1/02*    (2006.01)

(52) U.S. Cl.
CPC ........ *H04N 5/2257* (2013.01); *H04M 1/0264* (2013.01); *H04M 1/0268* (2013.01); *H04N 7/142* (2013.01)

(58) Field of Classification Search
CPC .. H04N 5/2257; H04N 7/142; H04N 5/23222; H04N 5/23229; H04N 5/23245;
(Continued)

(56) References Cited

U.S. PATENT DOCUMENTS 8,738,101 B1    5/2014  Myr
2009/0148149 A1    6/2009  Chishima
(Continued)

FOREIGN PATENT DOCUMENTS

CN    107820014 A    3/2018

OTHER PUBLICATIONS

International Search Report dated Oct. 11, 2019, issue in International Patent Application No. PCT/KR2019/008323.
(Continued)

*Primary Examiner* — Hung H Lam
(74) *Attorney, Agent, or Firm* — Jefferson IP Law, LLP

(57) ABSTRACT

A device and a method for capturing media by using a device including a plurality of flaps are provided. At least two flaps among the plurality of flaps each include at least one camera. The method includes analyzing preview images of the cameras based on a first media capture mode, adjusting a bend angle between the at least two flaps based on the analysis of the preview images to determine at least one baseline distance, and obtaining at least one media in the first capture mode at the at least one baseline distance.

20 Claims, 16 Drawing Sheets

(58) Field of Classification Search
CPC .. H04N 5/2258; H04N 5/2624; H04N 5/2252; H04N 13/243; H04M 1/0268; H04M 1/0264; H04M 1/0216; H04M 2250/52
See application file for complete search history.

(56) References Cited

U.S. PATENT DOCUMENTS

| | | | |
|---|---|---|---|
| 2010/0007714 A1* | 1/2010 | Kim | H04N 13/243 348/36 |
| 2010/0011291 A1* | 1/2010 | Nurmi | G06F 1/1652 715/702 |
| 2013/0044240 A1* | 2/2013 | Leskela | H04N 5/2258 348/239 |
| 2014/0002402 A1 | 1/2014 | Kang et al. | |
| 2014/0285618 A1* | 9/2014 | Cho | H04N 5/2258 348/38 |
| 2015/0130942 A1* | 5/2015 | Fujita | B60R 1/00 348/148 |
| 2015/0381929 A1 | 12/2015 | Lee | |
| 2016/0029007 A1 | 1/2016 | Kim et al. | |
| 2016/0093064 A1 | 3/2016 | Kobayashi | |
| 2016/0248985 A1* | 8/2016 | Mate | H04N 5/23238 |
| 2017/0052566 A1* | 2/2017 | Ka | G06F 1/1694 |
| 2017/0094168 A1 | 3/2017 | Kang et al. | |
| 2017/0236302 A1 | 8/2017 | Arth et al. | |
| 2017/0251193 A1 | 8/2017 | Zhou et al. | |
| 2018/0033162 A1 | 2/2018 | Chang et al. | |
| 2018/0227478 A1* | 8/2018 | Li | H04N 5/23212 |

OTHER PUBLICATIONS

Extended European Search Report dated May 21, 2021, European Application No. 19830787.8-1208.
Lee et al., "Enhanced Autofocus Algorithm Using Robust Focus Measure and Fuzzy Reasoning" XP 011226689, Sep. 1, 2008.
Molina et al., "A Layered Approach for Fast Multi View Stereo Panorama Generation" XP 032090793, Dec. 5, 2011.

* cited by examiner (RELATED ART)  (RELATED ART)  (RELATED ART)

ELECTRONIC DEVICE FOR CAPTURING MEDIA USING A BENDABLE DISPLAY AND METHOD THEREOF

CROSS-REFERENCE TO RELATED APPLICATION(S)

This application is based on and claims under 35 U.S.C. § 119(a) of an Indian patent application number 201841025398, filed on Jul. 6, 2018, and an Indian patent application number 201841025398, filed on Mar. 19, 2019, both in the Indian Intellectual Property Office, and a Korean patent application number 10-2019-0072492, filed on Jun. 18, 2019, in the Korean Intellectual Property Office, the disclosure of each of which is incorporated by reference herein in its entirety.

BACKGROUND

1. Field

The disclosure relates to capturing media. More particularly, the disclosure relates to a method and a system for capturing media by using a device including a bendable display.

2. Description of Related Art

Devices including a bendable display may include a plurality of flaps, in which cameras can be present. The distance between cameras in different two or more flaps among the plurality of flaps can be referred to as a baseline distance. In current devices, the baseline distance is fixed. As a result, the cameras may not be able to capture media (which can be at least one of image, video, and so on) with the desired effects or may not be able to reproduce a scene, as visualized by the user. For example, with a fixed baseline distance, the ability of the device to focus on objects at different depths can be limited. This is because the depth at which the device can focus is inversely proportional to the baseline distance, which is fixed. With a fixed baseline distance, the disparity map or depth map can be used. In another example, the efficiency of three dimensional (3D) reconstruction is likely to be minimized. With a fixed baseline distance, the capturing can be limited to planar stereo, single view point stereo, and so on.

FIGS. 1A, 1B, 1C, 1D and 1E depict an example scenario, wherein a user may not be able to capture a desired wide-angle selfie shot using a device with a fixed baseline distance according to the related art. In order to capture all the subjects in a wide-angle selfie shot, the user may have to manually perform a swivel motion. If the user is unable to swivel or if there is an error in the trajectory of rotation, then the wide-angle selfie may not be captured properly.

Referring to FIG. 1A, the field of view (FoV) of the camera(s) is limited as the baseline distance is fixed. The FoV or positions of the camera(s) should be adjusted by the user to capture all the subjects.

Referring to FIGS. 1B, 1C and 1D, a left view, a center view, and a right view are illustrated, respectively, which can be obtained by adjusting the position of the camera(s) by swiveling manually. The overlapping region, rotation, and translation between the views, can be estimated for fusing the views.

FIG. 1E depicts the fused image, which is the final wide-angle selfie shot.

Referring to FIG. 1E, a portion of some subjects is omitted due to the limited FoV of the camera(s). There can also be a possibility of artifacts, if the registration/fusion is not performed properly.

FIGS. 2A and 2B are perspective views of an example scenario, wherein selective focus can be limited to objects at a certain depth according to various embodiments of the related art.

Referring to FIG. 2A, a preview of the cameras is depicted. As depicted in FIG. 2A, there are multiple objects in the preview, located at various depths. As the baseline distance is fixed, the ability to focus on an object can depend on the depth at which the object is located. In an example, for selective focus, the distance between the object and the cameras can be in a range of 0.5-1 m.

Referring to FIG. 2B, only the object which is nearest to the camera is selectively focused.

FIG. 3 is a perspective view of an example scenario, wherein tracking of an object in motion can result in background blurring according to the related art. When the user attempts to track an object in motion, in the preview, while capturing media, the background is likely to become blurred. This may be due to manual adjustment of the position(s) of the camera(s) to track the object in motion. The manual adjustment may be necessary as the baseline distance is fixed.

Referring to FIG. 3, the object is moving across a view 301, as visualized by the user. As the object moves through the view 301, the user can capture a plurality of media to track the object. The media captured by the user's manual adjustment of the camera are illustrated in captured media 302, 303, and 304. When the captured media (302-304) are fused, media 305 can be obtained. As depicted in FIG. 3, the background of the media 305 is completely blurred.

The above information is presented as background information only to assist with an understanding of the disclosure. No determination has been made, and no assertion is made, as to whether any of the above might be applicable as prior art with regard to the disclosure.

SUMMARY

Aspects of various embodiments of the disclosure provide a method for capturing media by using a device including at least one bendable flap, wherein each of the at least one bendable flap includes at least one camera, and wherein a baseline distance can be varied by adjusting a bend angle between the at least one bendable flap of the device.

Other aspects of various embodiments of the disclosure capture the media in different capturing modes, wherein a capturing mode is identified based on analysis of previews of the at least one camera, wherein the media can be captured in each of the identified capturing modes at suitable baseline distances, and wherein the bend angle is adjusted for obtaining the suitable baseline distances.

Other aspects of various embodiments of the disclosure perform an analysis of the previews of the cameras in the at least one bendable flap based on a selected capturing mode, wherein an error metric, if any, can be nullified by adjusting the bend angle, and wherein a suitable baseline distance is determined by adjusting the bend angle at which the media can be captured.

Other aspects of various embodiments of the disclosure display capture positions through a user interface, wherein the capture positions signify different bend angles between the bendable flaps and can be selected by a user to capture media.

Aspects of the disclosure are to address at least the above-mentioned problems and/or disadvantages and to provide at least the advantages described below. Accordingly, an aspect of the disclosure is to provide a device and a method for capturing media by using a device including a plurality of flaps. Each of the plurality of flaps includes at least one camera.

Additional aspects will be set forth in part in the description which follows and, in part, will be apparent from the description, or may be learned by practice of the presented embodiments.

In accordance with an aspect of the disclosure, a method is provided. The method includes analyzing previews of cameras included in at least two flaps of a device based on a first capture mode, adjusting a bend angle between the at least two flaps based on the analysis of the previews to determine at least one baseline distance corresponding to the first capture mode, and obtaining at least one media in the first capture mode at the at least one baseline distance.

In accordance with another aspect of the disclosure, a device is provided. The device includes an analyzer unit configured to analyze previews of cameras included in at least two flaps of the device based on a first capture mode, a processing unit configured to adjust a bend angle between the at least two flaps based on the analysis of the previews to determine at least one baseline distance corresponding to the first capture mode, and a media capturing unit configured to obtain at least one media in the first capture mode at the at least one baseline distance.

Other aspects, advantages, and salient features of the disclosure will become apparent to those skilled in the art from the following detailed description, which, taken in conjunction with the annexed drawings, discloses various embodiments of the disclosure. It should be understood, however, that the following descriptions, while indicating embodiments and numerous specific details thereof, are given by way of illustration and not of limitation. Many changes and modifications may be made within the scope of the embodiments of the disclosure without departing from the spirit thereof, and the embodiments of the disclosure include all such modifications.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
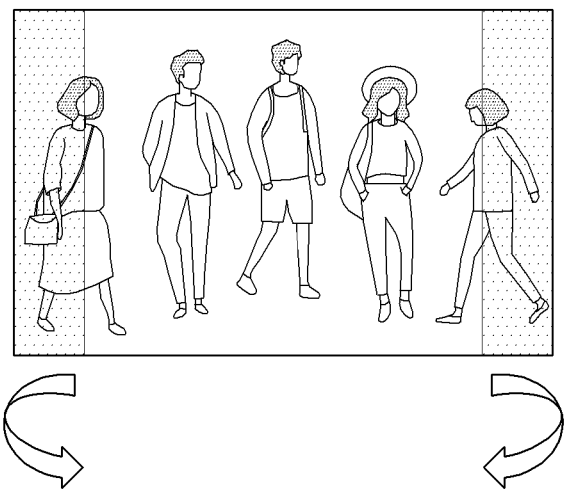
FIGS. 1A, 1B, 1C, 1D, and 1E depict an example scenario, wherein a user may not be able to capture a desired wide-angle selfie shot using a device with a fixed baseline distance according to various embodiments of the related art.
Figure 1B:
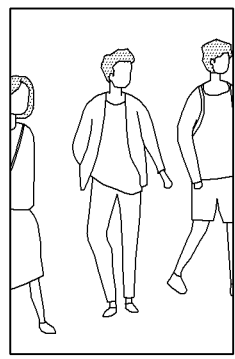
Figure 1C:
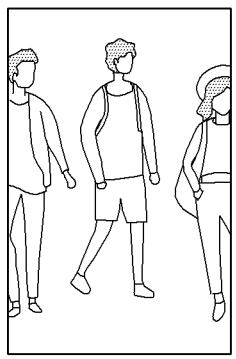
Figure 1D:
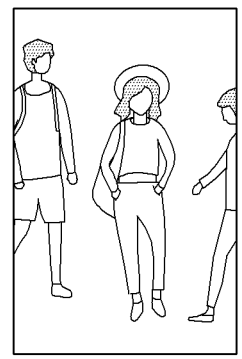
Figure 1E:
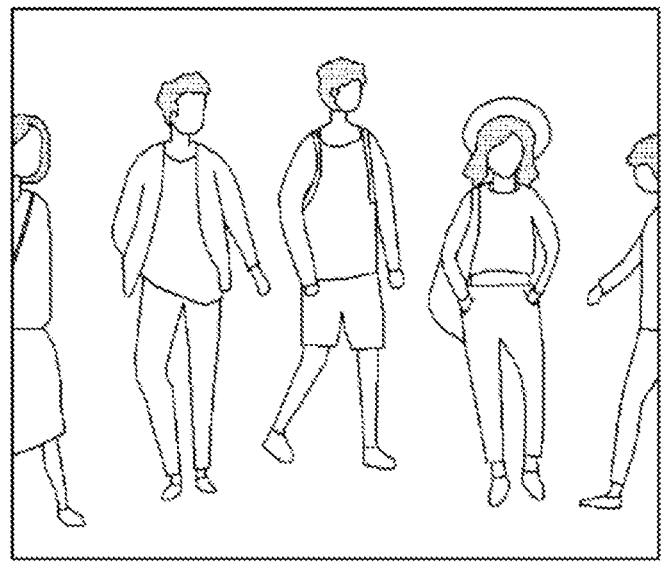
Figure 2A:
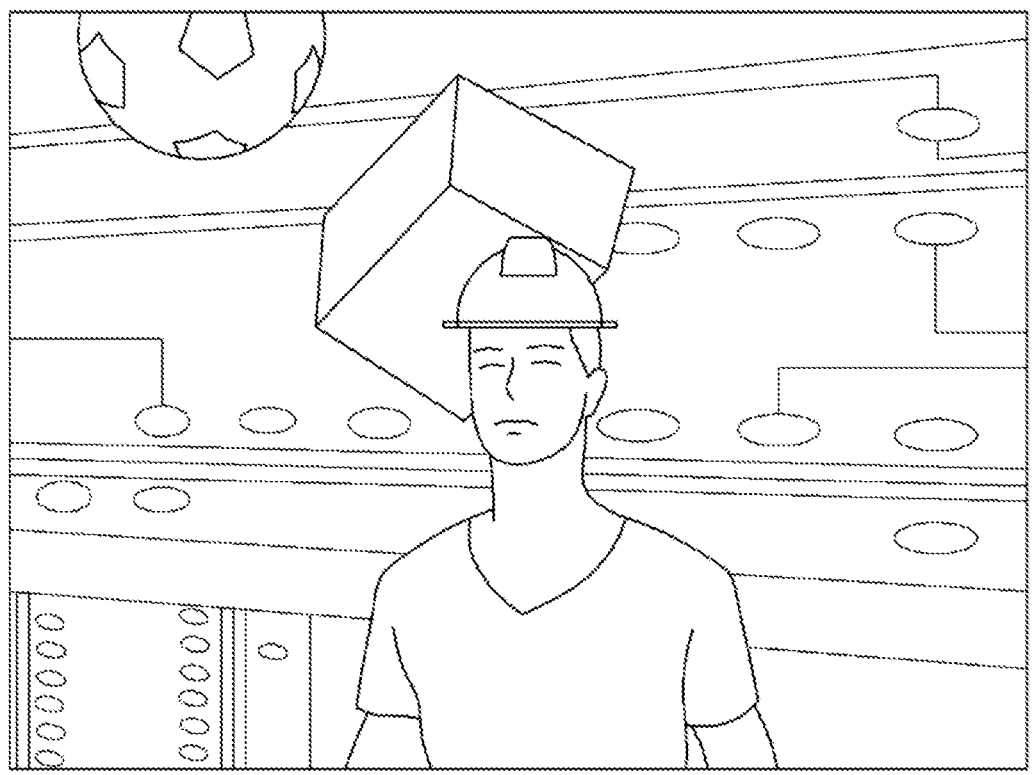
FIGS. 2A and 2B are a perspective view of an example scenario, wherein selective focus can be limited to objects at a certain depth according to various embodiments of the related art.
Figure 2B:
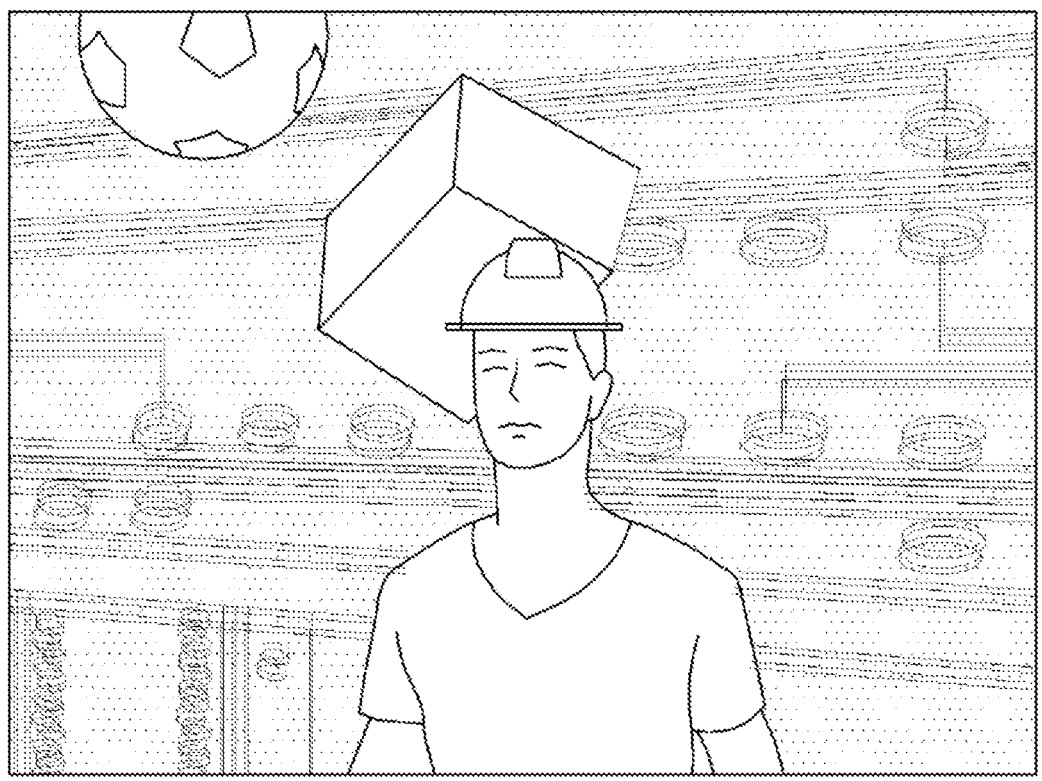
Figure 3:
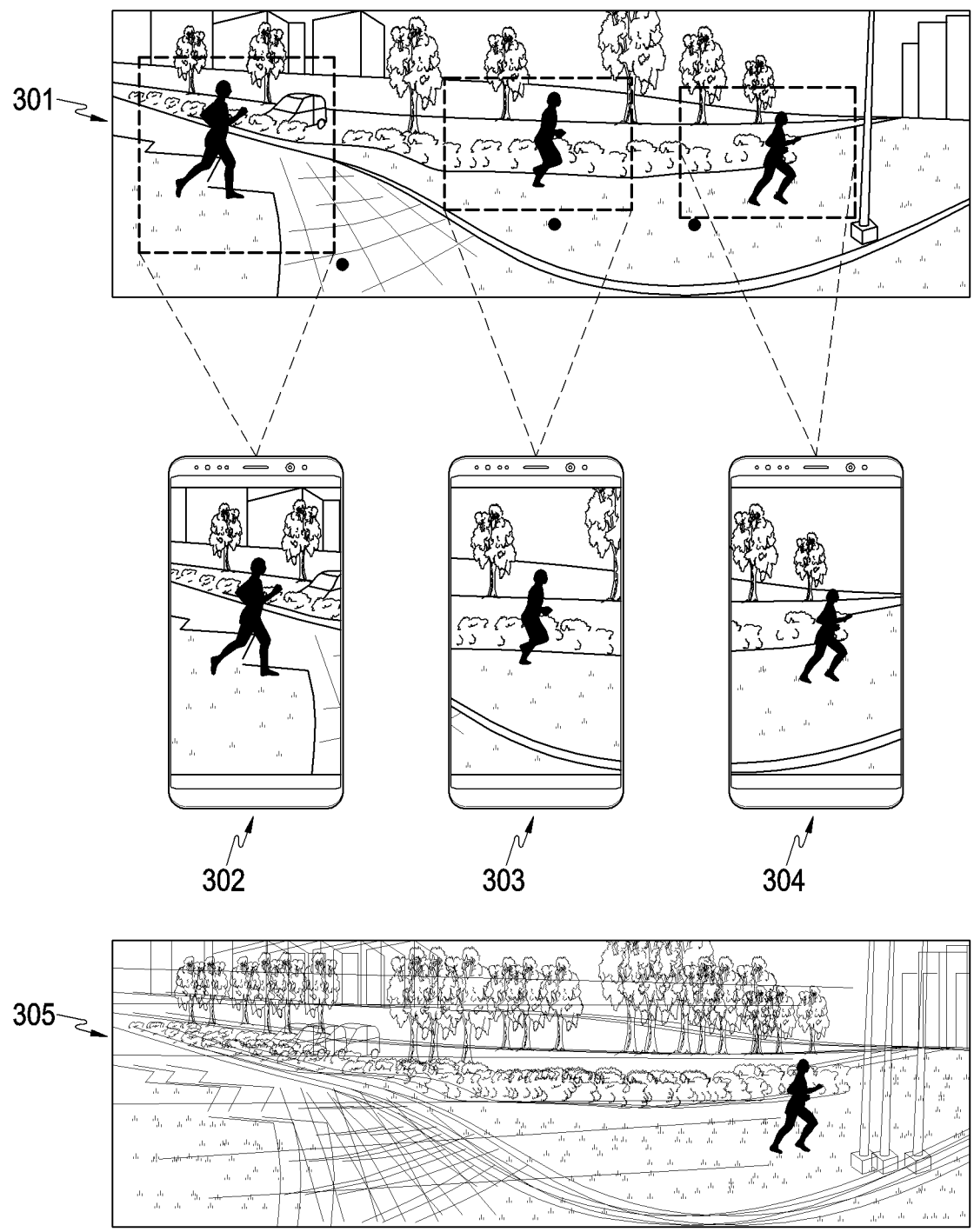
FIG. 3 is a perspective view of an example scenario, wherein tracking of an object in motion can result in background blurring according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Embodiments of the disclosure disclose a method for capturing media in multiple modes using a device including at least one flap, wherein the at least one flap may include at least one camera. Embodiments of the disclosure may determine a field of view (FoV) of each of the cameras included in the at least one flap, and an overlap between the FoVs of the camera(s) included in the at least one flap. Embodiments of the disclosure may include estimating a bend angle. Here, the bend angle specifies the angle between at least one flap of a device and one or more portions of the device, which can be another flap or a fixed portion of the device. Embodiments of the disclosure may estimate a baseline distance based on the determined bend angle. The baseline distance specifies the distance between the cameras in the different flap(s).

According to various embodiments of the disclosure, a device may receive a selection of a mode for capturing media. Based on the mode selected by the user, the embodiments of the disclosure may perform an analysis of previews of the cameras in the at least one flap. Based on the analysis, an error metric may be determined, and the error metric may indicate whether the bend angle requires an adjustment for capturing the media properly. Embodiments of the disclosure may adjust the bend angle in order to nullify the error metric. The adjustment of the bend angle may determine a suitable baseline distance at which the media can be captured using the mode selected by the user.

According to various embodiments of the disclosure, modes in which the media is captured may be identified based on the analysis of the previews of the cameras in the at least one flap. For each of the media capture modes, a corresponding error metric may exist. The bend angle may be adjusted to nullify the error metrics, and may be adjusted so as to arrive at the suitable baseline distances at which the media capturing is performed in each of the identified modes.

Referring now to the drawings, and more particularly to FIGS. 4 through 12, where similar reference characters denote corresponding features consistently throughout the figures, there are shown preferred embodiments.

Figure 4:
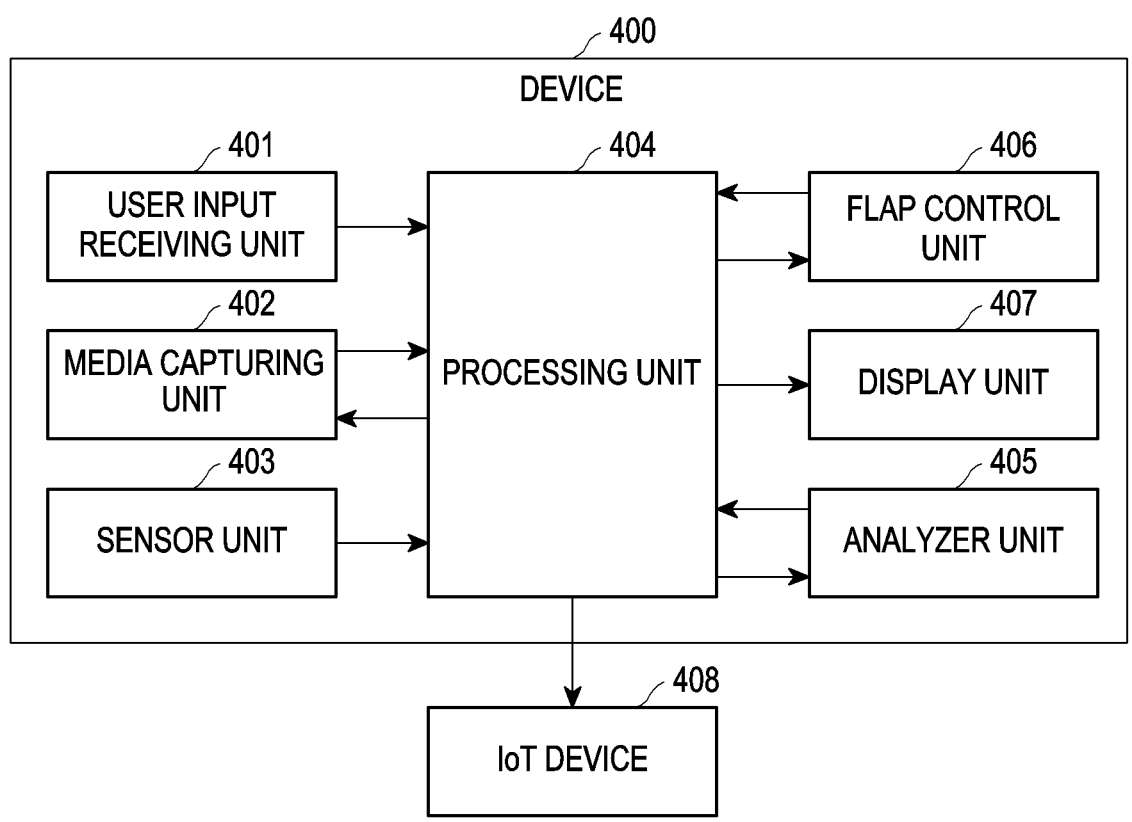
FIG. 4 depicts various units of a device for capturing media in multiple media capture modes according to various embodiments of the disclosure.

FIG. 4 depicts various units of a device for capturing media in multiple modes according to various embodiments of the disclosure. A device 400 can be a flexible electronic device, including at least one flap, which can be bendable. According to an embodiment of the disclosure, the device 400 may include one or more portions, wherein at least one portion of the device 400 can be flipped to an open position and another portion can be static. Embodiments of the disclosure refer to each portion of the device 400 as a flap. The at least one flap can include at least one camera. In various embodiments of the disclosure, the device 400 can be a device with a bendable display. The device 400 can be, but is not limited to, mobile phones, smart phones, tablets, computers, laptops, wearable computing devices, or internet of things (IoT) devices. The device 400 may capture media such as one or more image or one or more video.

Referring to FIG. 4, the device 400 may include a user input receiving unit 401, a media capturing unit 402, a sensor unit 403, a processing unit 404, an analyzer unit 405, a flap control unit 406, and a display unit 407. According to an embodiment of the disclosure, the device 400 may be connected to at least one IoT device.

According to various embodiments of the disclosure, the user input receiving unit 401 may provide inputs, which have been received from a user, to the device 400. The user input receiving unit 401 may include, but is not limited to, at least one of the display unit 407, a touchscreen display, at least one switch, or at least one sensor. The user input receiving unit 401 may receive inputs from a user intending to capture media. In an embodiment of the disclosure, the input received from the user may include a selection of a media capture mode. In an example, the media capture mode can be wide-angle selfie, near/far field focus, three dimensional (3D) reconstruction, object tracking, cinematic shot, panorama, and so on.

The media capturing unit 402 can capture the media based on the received user inputs. According to various embodiments of the disclosure, the media capturing unit 402 may include at least one camera. The sensor unit 403 can determine an angle between the flaps of the device 400 (hereinafter referred to as initial bend angle). The sensor unit 403 can estimate an initial noise. The processing unit 404 can receive the user inputs from the user input receiving unit 401, and the initial bend angle from the sensor unit 403. The processing unit 404 can compute an initial baseline distance (i.e., a distance between the cameras in the flaps) based on the initial bend angle. The processing unit 404 can store the initial bend angle and the initial baseline distance.

In an embodiment, a user can select a particular media capture mode to capture the media. The user can indicate the selection to the device 400 through the user input receiving unit 401. The processing unit 404 can receive the user input. Based on the selected media capture mode, the processing unit 404 can direct the analyzer unit 405 to analyze previews of the cameras in the media capturing unit 402. The processing unit 404 can retrieve the previews of the cameras from the media capturing unit 402. The processing unit 404 can control and manage the settings of the media capturing unit 402, according to the selected media capture mode.

The analyzer unit 405 can obtain the previews from the processing unit 404. The analyzer unit 405 can analyze the content of the previews of the cameras. The previews can include objects and/or subjects, which can be detected by the analyzer unit 405. The analysis of the preview can include at least one of saliency detection (if a salient object is detected), face detection (if a person is detected), eye/pupil detection, facial expression detection, object tracking (if a moving object is detected), blur detection (if occurrence of blurring is detected while capturing the moving object), determining depth and disparity of objects detected in the previews, determining registration errors (such as errors that occur when attempting to capture a cinematic shot or panorama), or pose estimation.

The analyzer unit 405 can provide a feedback of the analysis of the previews to the processing unit 404. Based on the feedback received from the analyzer unit 405, the processing unit 404 can compute an error metric, if any. The error metric can depend on the media capture mode selected by the user. The error metric can be, for example, peak signal to noise ratio (PSNR), structural similarity (SSIM) on an overlap/stitch area, and so on. In order to perfectly capture the media (with a high quality), the processing unit 404 should nullify the error metric. The processing unit 404 can nullify the error metric by adjusting the bend angle between the flaps. When the bend angle is adjusted, the baseline distance between cameras included in the flaps is also adjusted. The processing unit 404 can nullify the error metric for the selected media capture mode by detecting a suitable baseline distance corresponding to the selected media capture mode through the adjustment of the bend angle.

The processing unit 404 can direct the flap control unit 406 to adjust the bend angle of the cameras in the flaps of the device 400, and when the baseline distance between the cameras changes according to the adjustment of the bend angle, the error metric can be nullified. The bend angle can be adjusted automatically by the device 400 or manually by the user. The device 400 can adjust the bend angle using an electronically controlled hinge mechanism or gyro angle based estimation.

The processing unit 404 can detect a suitable baseline distance corresponding to the selected capture mode by determining whether the error metric is nullified by the adjustment of the bend angle. For instance, when the bend angle is adjusted to find the suitable baseline distance, the analyzer unit 405 can retrieve the previews from the media capturing unit 402 through the processing unit 404. The analyzer unit 405 can perform an analysis of the previews and send the feedback to the processing unit 404. The processing unit 404 can compute the error metric and confirm whether the error metric is nullified.

When the error metric has been nullified, the processing unit 404 can allow or direct the media capturing unit 402 to capture the media. The processing unit 404 can retrieve the captured media from the media capturing unit 402 and deliver the captured media to the display unit 407. The display unit 407 can display the captured media to the user.

In another embodiment of the disclosure, a user may not select a particular media capture mode to capture media. For example, when the user directs the media capturing unit 402 to capture the media, media capturing can be performed in a predefined or default media capture mode(s). For another example, when the user does not select a particular media capture mode, the processing unit 404 can identify possible media capture mode(s) in which media can be captured. The processing unit 404 can direct the analyzer unit 405 to analyze previews of the cameras. The processing unit 404 can retrieve the previews of the cameras and send the retrieved previews to the analyzer unit 405.

The analyzer unit 405 can analyze the content of the previews of the cameras in the flaps of the device 400 at the initial bend angle and the initial baseline distance. The analyzer unit 405 can provide a feedback of the analysis of the previews to the processing unit 404. Based on the feedback received from the analyzer unit 405, the processing unit 404 can identify the possible media capture mode(s), among all the predefined media capture modes, for capturing the media.

When the media capture mode(s) are identified, the media can be captured. If a plurality of media capture modes is identified, then media can be captured for each of the identified media capture modes. The processing unit 404 can compute the error metric(s) of the media captured for each of the identified media capture mode(s). If the error metric of a particular media capture mode is nullified or less, then media can be captured in that particular media capture mode. However, if the error metric(s) is higher than a tolerable limit for the identified media capture mode(s), as computed by the processing unit 404, the error metrics should be nullified. The error metric(s) of the media capture mode(s) can be nullified by adjusting the bend angle between the flaps of the device 400. When the error metric of a particular media capture mode is nullified, then media can be captured in the particular media capture mode.

According to various embodiments of the disclosure, a bend angle of the device 400 can be adjusted such that the error metric(s) of all the identified media capture mode(s) are nullified. The processing unit 404 can direct the flap control unit 406 to adjust the position of the cameras (bend angle) so as to adjust the baseline distance(s), and thus the error metric(s) of all the identified media capture mode(s) are nullified.

According to various embodiments of the disclosure, when the error metric(s) is nullified, the processing unit 404 can allow or direct the media capturing unit 402 to capture the media using the identified media capture mode(s). The processing unit 404 can retrieve the captured media from the media capturing unit 402 and deliver the captured media to the display unit 407. The display unit 407 can display the captured media to the user.

The captured media can be of high quality. According to various embodiments of the disclosure, the device 400 is capable of reproducing scenes as viewed by the human eye, thereby providing an enhanced user experience.

The device 400 can control the IoT device 408 through the processing unit 404. For example, consider that the device 400 is in an environment wherein the lighting is dim. The sensor unit 403 can determine that the lighting is low. The analyzer unit 405 can obtain previews from the media capturing unit 402 and determine that the user is engaged in reading content. In such circumstances, the processing unit 404, based on a feedback from the analyzer unit 405, can direct the IoT device 480 to increase the lighting in the user environment. It is assumed that the IoT device 408 can control the lighting in the user environment.

FIG. 4 shows various units of the device 400, but it should be understood that the present disclosure is not limited thereto. According to various embodiments of the disclosure, the device 400 may include fewer or a greater number of units. Further, the labels or names of the units can be used only for illustrative purpose and do not limit the scope of the disclosure. One or more units can be combined together to perform same or substantially similar function in the device 400.

Figure 5:
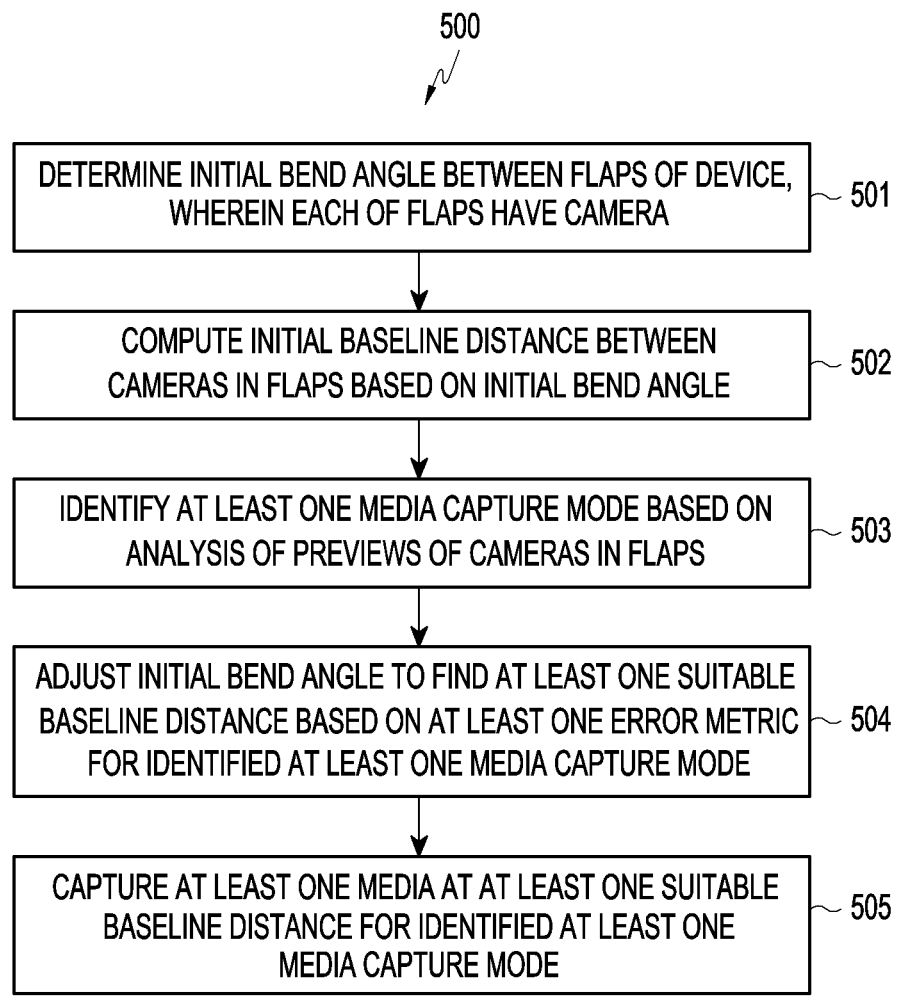
FIG. 5 is a flowchart depicting a method for capturing media using at least one media capture mode of a device according to various embodiments of the disclosure.

FIG. 5 is a flowchart depicting a method for capturing media using at least one media capture mode of the device 400 according to various embodiments of the disclosure. At operation 501 of the method 500, the device 400 may determine an initial bend angle between the flaps. At operation 502, the device 400 may compute an initial baseline distance based on the initial bend angle.

At operation 503, the device 400 may identify at least one media capture mode based on an analysis of previews of the cameras included in the flaps. For example, the media capture modes might be wide-angle selfie, near/far field focus, 3D reconstruction, object tracking, cinematic shot, or panorama. According to various embodiments, the device 400 may retrieve the previews from the cameras. When the previews have been retrieved from the cameras, the device 400 may identify at least one media capture mode which is available in the device 400 through the analysis of the previews. A predefined number of media capture modes for the device 400 may exist, and based on the analysis of previews, the at least one media capture mode among the predefined number of media capture modes can be identified.

At operation 504, the device 400 may adjust the initial bend angle based on at least one error metric for the identified at least one media capture mode, and find at least one suitable baseline distance corresponding to the at least one media capture mode. For example, when two media capture modes are identified with respect to the device 400, the device 400 may determine the error metrics for the two media capture modes. The error metrics can be determined based on the analysis of the previews. The device 400 may adjust the initial bend angle based on the determined error metrics to nullify the error metrics. According to various embodiments of the disclosure, the initial bend angle is adjusted so as to arrive at a first bend angle. The device 400 may determine whether the computed baseline distance at the first bend angle is suitable for the first media capture mode. When it is determined that the computed baseline distance for the first media capture mode is suitable, the error metric corresponding to the first media capture mode can be nullified. When it is determined that the computed baseline distance for the first media capture mode is not suitable, the device 400 can continuously adjust the bend angle to arrive at the second bend angle. The device 400 can determine whether the computed baseline distance at the second bend angle is suitable for the second media capture mode. When it is determined that the computed baseline distance for the second media capture mode is suitable, the error metric corresponding to the second media capture mode can be nullified. When it is determined that the computed baseline distance for the second media capture mode is not suitable, the device 400 can adjust the bend angle until a suitable baseline distance, at which the error metric is nullified, is to be found.

According to various embodiments of the disclosure, a first media capture mode can be wide-angle selfie. When a plurality of subjects are detected in the previews, a device 400 may perform face detection for the plurality of subjects. The error metric might be a subject missing or a portion of a subject missing. The error metric may be nullified by adjusting the bend angle in order to increase the FoV of the cameras. According to various embodiments of the disclosure, a second media capture mode can be near/far field focus. When the previews include multiple objects, the device 400 may detect a plurality of objects. The error metric can be a lack of focus on a particular object with a certain depth. The device 400 adjusts the bend angle in order to obtain a focus on the particular object so that the error metric can be nullified.

At operation 505, the device 400 may capture at least one media at the at least one suitable baseline distance determined for the at least one media capture mode. For example, the device 400 may capture a first media when the error metric corresponding to the first media capture mode is nullified. When the error metric is nullified, the first media can be captured to include all the subjects within the FoV of the cameras.

For another example, the device 400 may capture a second media when the error metric corresponding to the second media capture mode is nullified. When the error metric is nullified, the second media can be captured to focus on the particular object.

In an embodiment of the disclosure, when two media capture modes are identified, two suitable baseline distances are sequentially determined by continuously adjusting the bend angle. Each media capture mode was considered to have a single suitable baseline distance. However, according to various embodiments of the disclosure, multiple media capture modes may be identified, wherein each of the identified media capture modes may have multiple suitable baseline distances. The suitable baseline distances corresponding to different media capture modes may be determined simultaneously (i.e., a same baseline distance may be suitable for multiple media capture modes) or sequentially determined. When the identified media capture mode has multiple suitable baseline distances (for example: cinematic shot, panorama, object tracking, etc.), media can be captured at the suitable baseline distances.

The various actions in the method 500 may be performed in the order presented in FIG. 5, in a different order, or simultaneously. Further, in some embodiments, some actions listed in FIG. 5 may be omitted.

Figure 6:
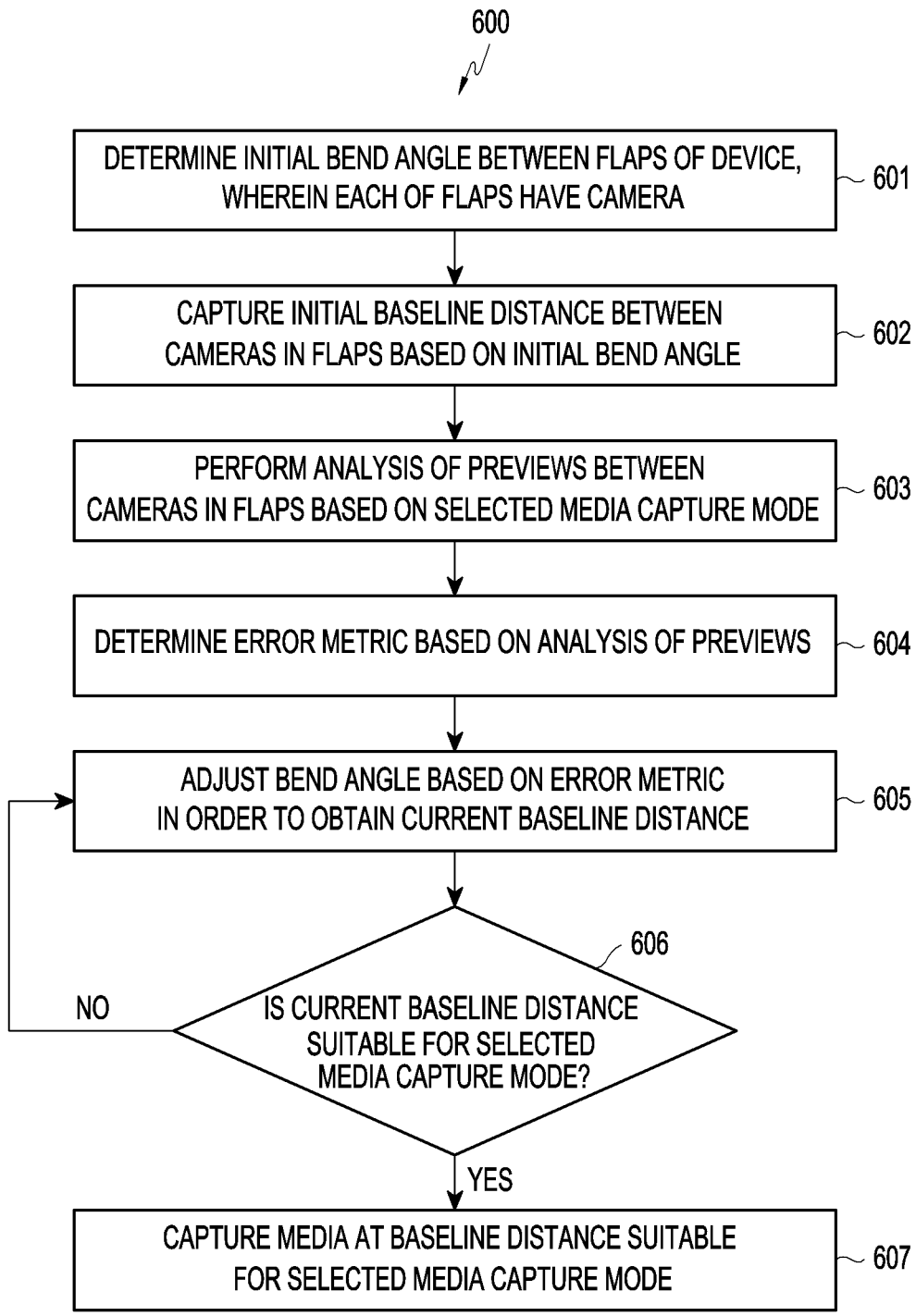
FIG. 6 is a flowchart depicting a method for capturing media by using the device, in a media capture mode selected by a user input, according to various embodiments of the disclosure.

FIG. 6 is a flowchart depicting a method for capturing media, using the device 400, in a media capture mode selected by a user, according to various embodiments of the disclosure. At operation 601 of the method 600, the device 400 determines an initial bend angle between the flaps. At operation 602, the device 400 may compute an initial baseline distance based on the determined initial bend angle. At operation 603, the device 400 may perform an analysis of previews of the cameras, included in the flaps, based on the media capture mode selected by a user input. The analysis of the previews can be performed at the initial bend angle which is computed corresponding to the initial bend angle. For example, when the selected media capture mode is object tracking, the device 400 may analyze the previews at the initial baseline distance to detect objects in motion.

At operation 604, the device 400 may determine an error metric based on the analysis of the previews. When the initial baseline distance is suitable for capturing the media in the selected media capture mode, there will be no error metric. When there is no error metric, the device 400 may obtain at least one media by performing image capturing in the selected media capture mode at the initial baseline distance. According to various embodiments of the disclosure, the existence of the error metric, however, may indicate that the initial baseline distance is not suitable for capturing the media in the selected media capture mode. For example, the device 200 may determine whether the background is likely to be blurred when a shot is captured. The determination on whether or not blur occurs may be made based on the error metric, which corresponds to a type of the selected media capture mode.

At operation 605, the device 400 may adjust the bend angle between the flaps based on the determined error metric. In order to capture the media, the error metric should be nullified. The error metric can be nullified by adjusting the bend angle. When the bend angle has been adjusted, the baseline distance between cameras included in the flaps may be determined.

At operation 606, the device 400 may determine whether the determined baseline distance is suitable for nullifying the error metric for the selected media capture mode. As the bend angle between the flaps has been adjusted, there is a possibility for finding the suitable baseline distance corresponding to the selected media capture mode. When image capturing is performed at the suitable baseline distance, the device 400 may acquire media having a good quality in the selected media capture mode. According to various embodiments of the disclosure, the device 400 may verify whether the determined baseline distance is suitable. When it is determined that the error metric for the selected media capture mode is nullified, the device 400 may determine that the determined baseline distance is suitable for the selected media capture mode. When it is determined that the error metric for the selected media capture mode is not nullified, the device 400 may determine that the determined baseline distance is not suitable for the selected media capture mode, and perform the operation 605 again. The device 400 may continuously adjust the bend angle until a suitable baseline distance is obtained.

When it is determined that the determined baseline distance is suitable for the selected media capture mode, at operation 607, the device 400 may capture the media at the determined baseline distance in the selected media capture mode. For example, when the media capture mode is object tracking, the device 400 may discover multiple suitable baseline distances at which the detected object can be captured. In relation to the respective baseline distances, the device 400 may verify the nullification of the error metric (e.g., blurring of the background) and then perform image capturing in the object tracking mode.

Operations in the flowchart 600 may be performed in the order presented, in a different order, or simultaneously. Further, in some embodiments, some operations listed in FIG. 6 may be omitted.

FIGS. 7A, 7B, 7C, and 7D depict baseline distances and FoV of cameras, which varies corresponding to adjustment of the bend angle, according to various embodiments of the disclosure. According to various embodiments of the disclosure, the device 400 may include two flaps (labeled as '1') and two cameras (labeled as '2'). Each of the two flaps may include a single camera. The angle between the flaps (labeled as '3') is the bend angle. The distance between the cameras (labeled as '4') is a baseline distance. Each camera has FoV (labeled as '5') and there is a region of overlap between the FoVs of the cameras (labeled as '6'). When the bend angle between the flaps varies, baseline distance between the cameras may vary, and the region of FoV of the cameras may overlap.

Figure 7A:
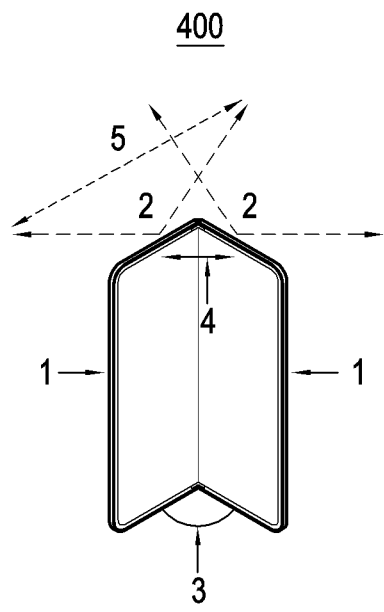
FIGS. 7A, 7B, 7C, and 7D depict baseline distance and field of view (FoV) of cameras, which are changed in response to adjustment of a bend angle, according to various embodiments of the disclosure.

Referring to FIG. 7A, the bend angle and the baseline distance depicted can be considered to be the initial bend angle and the initial baseline distance.

Figure 7B:
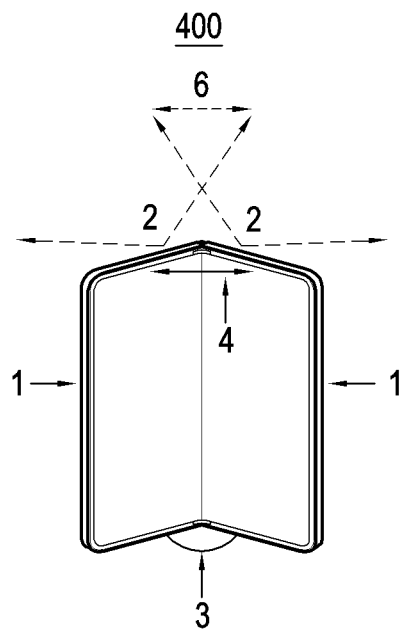
Figure 7C:
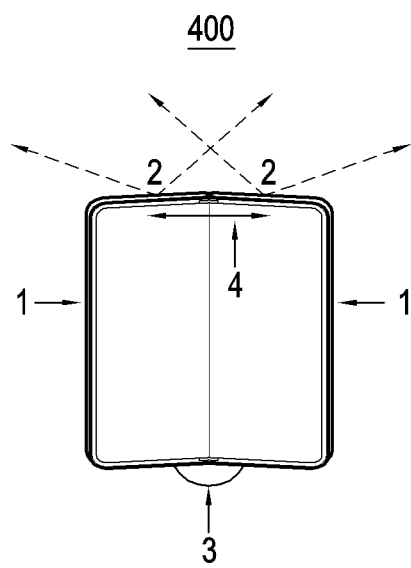
Figure 7D:
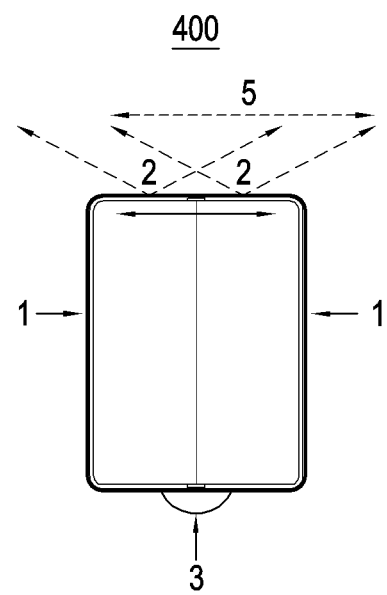

Referring to FIGS. 7B to 7D, the bend angle between the flaps is progressively varied according to various embodiments of the disclosure. For example, the device 400 can be configured to capture media in a single media capture mode or multiple media capture modes. At least one suitable baseline distance corresponding to each mode can be obtained by varying the bend angle so as to arrive at a suitable bend angle. The device 400 may capture at least one media at the at least one suitable baseline distance corresponding to the media capture mode(s).

Figure 8:
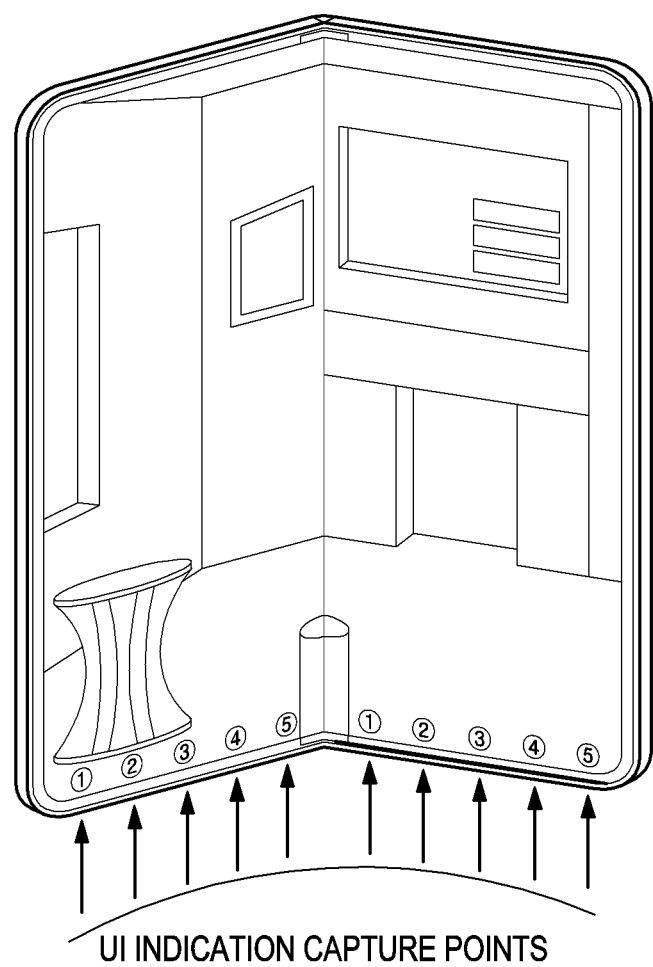
FIG. 8 depicts a user interface (UI) for controlling a bend angle between flaps when media is captured by using a device according to various embodiments of the disclosure.

FIG. 8 depicts a user interface (UI) for controlling a bend angle between flaps when media capturing is performed using the device 400 according to various embodiments of the disclosure.

Referring to FIG. 8, the UI may include a plurality of buttons. The plurality of buttons may correspond to different multiple bend angles, respectively. When the user selects one of the buttons displayed on the UI, the device 400 may adjust the bend angle to an angle corresponding to the selected button, and thus the cameras may be aligned at a particular angle at which the cameras can capture the media. In another embodiment, one of the plurality of buttons can be configured to indicate the current bend angle or the range in which the current bend angle lies.

Figure 9A:
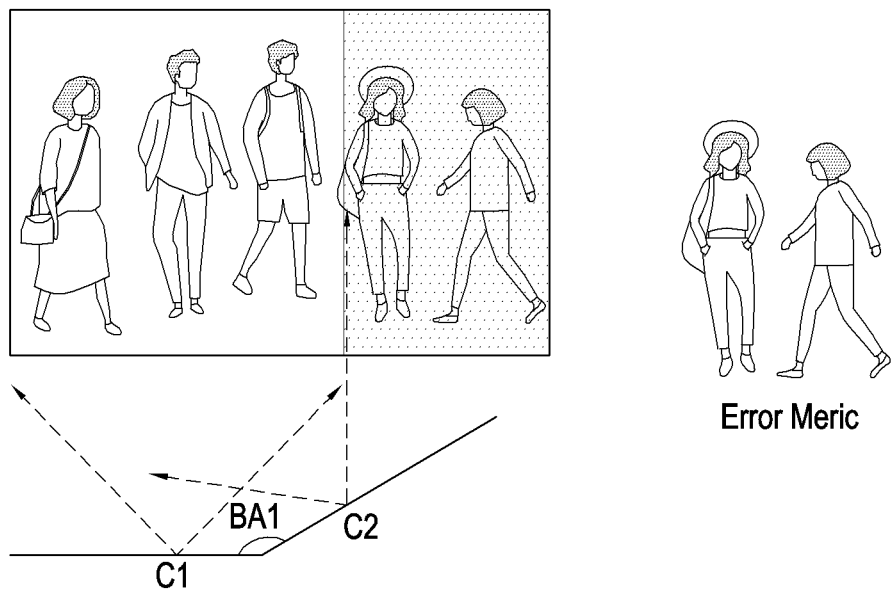
FIGS. 9A, 9B, and 9C depict an example scenario where a wide-angle selfie is captured by changing a bend angle between flaps of a device according to various embodiments of the disclosure.
Figure 9B:
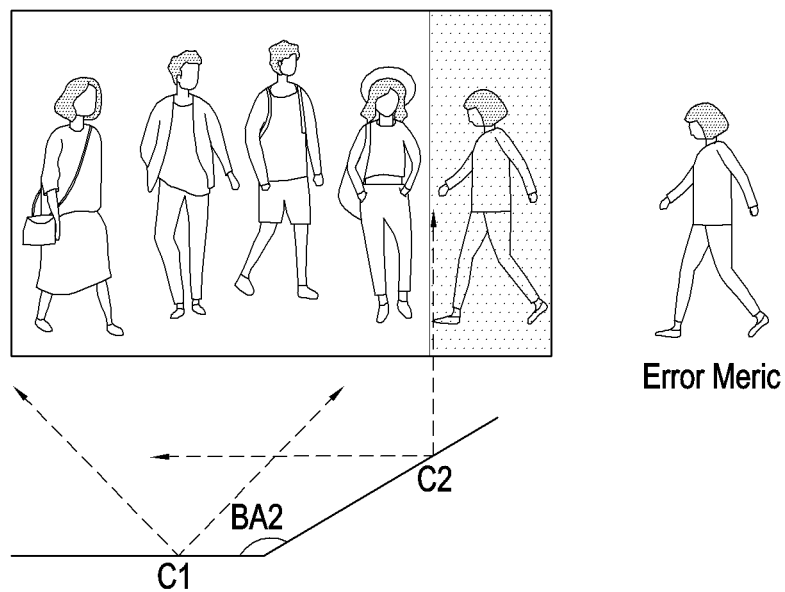
Figure 9C:
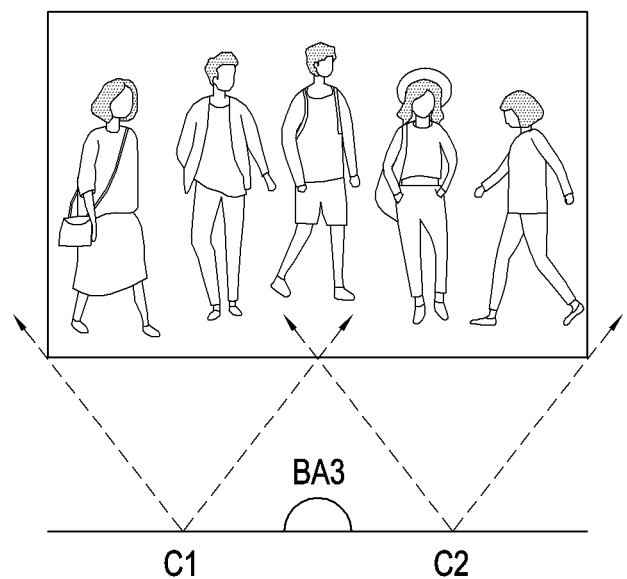

FIGS. 9A, 9B, and 9C depict an example scenario where a wide-angle selfie is captured by varying the bend angle between the flaps of the device 400, according to various embodiments of the disclosure. The device 400 may include two flaps, and each flap may include a single camera. In FIGS. 9A to 9C, cameras can be labeled as F1 and F2. The device 400 may detect five subjects based on the analysis of the preview of C1 and C2, and determine the bend angle between the two flaps and the baseline distance at the bend angle so as to acquire media including all of the detected subjects. The bend angle BA1, depicted in FIG. 9A, can be considered as the initial bend angle.

Referring to FIG. 9A, the FoV of C2 is not sufficient to capture all the subjects. In FIG. 9A, the portion of the preview, which is not within the FoV of C1 and C2, can be determined as the error metric.

In order to capture the wide-angle selfie, the error metric should be nullified. As depicted in FIG. 9B, the bend angle may be adjusted to arrive at a current bend angle BA2.

Referring to FIG. 9B, the FoV of C2 may cover a greater portion of the preview, as compared to the FoV of C2 depicted in FIG. 9A. The device may verify whether the baseline distance according to the bend angle BA2 is suitable. In FIG. 9B, since all the detected subjects are not covered, the device may determine that the baseline distance at the bend angle BA2 is not suitable.

Referring to FIG. 9C, the device 400 may adjust the bend angle between the flaps so that the bend angle arrives at the bend angle BA3. The device 400 may verify whether the baseline distance at BA3 is suitable. For example, when it is determined that the FoV of C2 at BA3 covers the entire preview, the device 400 determines that the error metric at the bend angle BA3 is nullified, and determine that the baseline distance at the bend angle BA3 is suitable for capturing the wide-angle selfie of the preview.

Figure 10A:
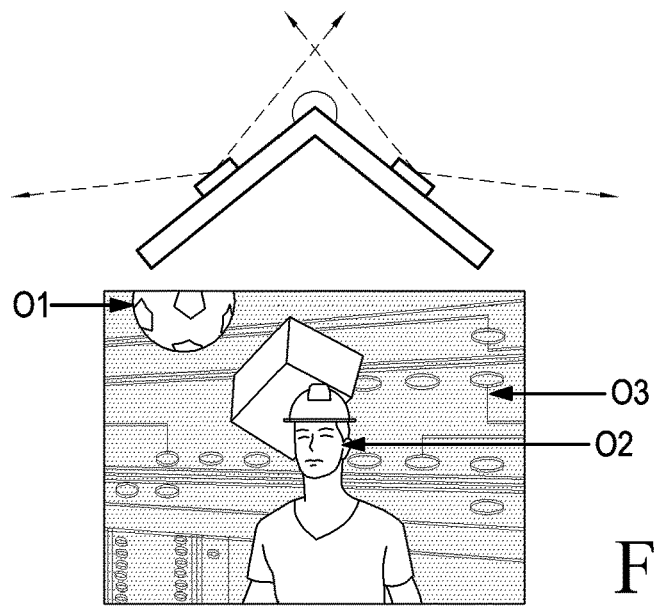
FIGS. 10A, 10B, and 10C depict an example where selective focus of objects at various depths is achieved by changing a bend angle between flaps of a device, according to various embodiments of the disclosure.
Figure 10B:
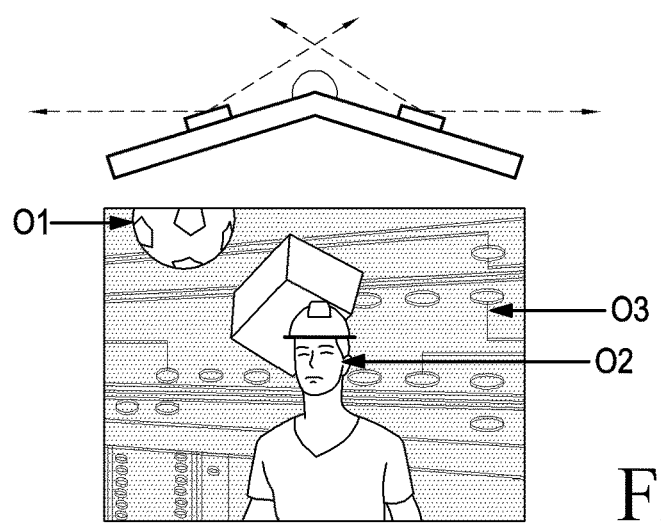
Figure 10C:
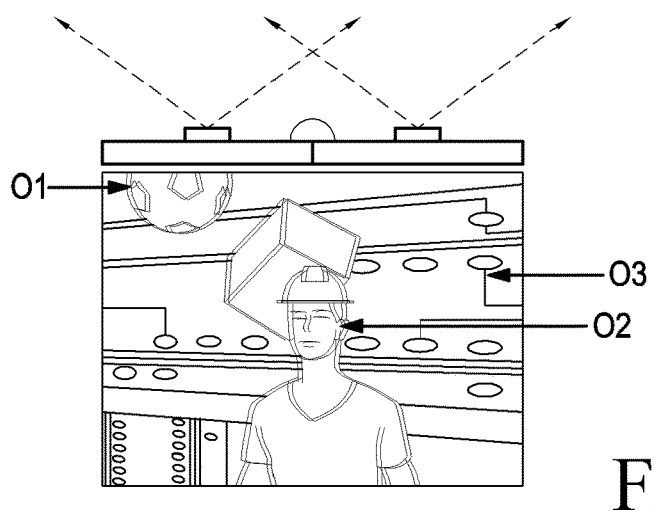

FIGS. 10A, 10B, and 10C depict an example where selective focus of objects at various depths is achieved by varying the bend angle between the flaps of the device 400, according to various embodiments of the disclosure. The device 400 includes two flaps, and each flap includes a single camera. The device 400 may detect three objects at different depths based on the analysis of the previews of the cameras. The detected objects can be labeled as O1, O2, and O3. The depths of the objects may increase in the order of O1, O2, and O3. The device 400 may determine the bend angle and the baseline distance at the bend angle.

Referring to FIG. 10A, at the bend angle, the device 400 may selectively focus on O1. For attaining a Bokeh effect, the remaining objects can be blurred. The device 400 may adjust the bend angle between the flaps so that the bend angle arrives at the bend angle depicted in FIG. 10B.

Referring to FIG. 10B, at the bend angle, the device 400 can selectively focus on O2. Similarly, the device 400 may adjust the bend angle between the flaps so that the bend angle arrives at the bend angle depicted in FIG. 10C.

Referring to FIG. 10C, at the bend angle, the embodiments can selectively focus on O3. Once the intended objects are focused selectively, the other objects can be blurred for attaining the Bokeh effect.

Figure 11:
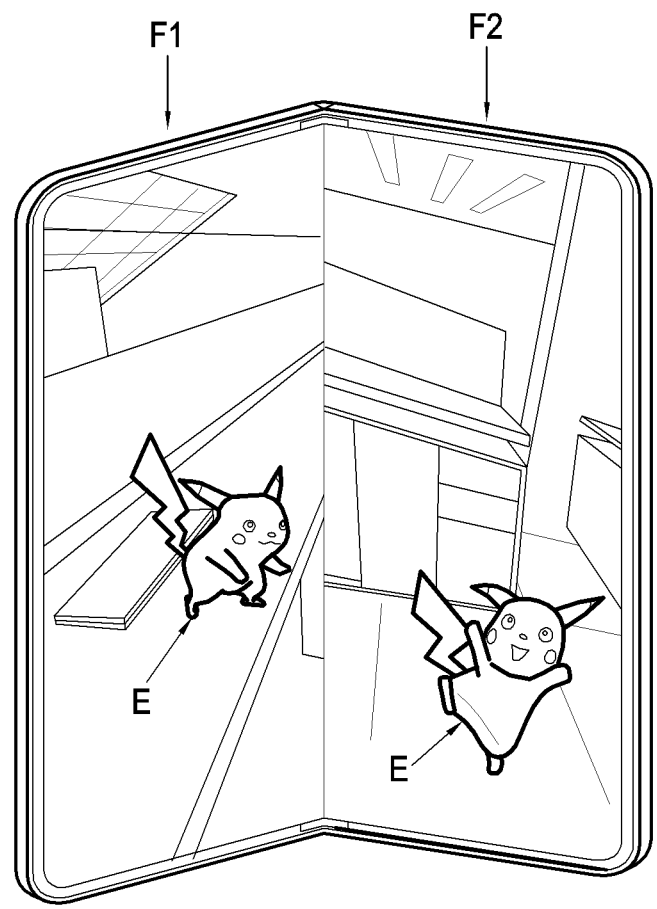
FIG. 11 depicts an example wherein the experience of Augmented Reality (AR) objects is visually enhanced by adjustment of bend angle between flaps of the device according to various embodiments of the disclosure.

FIG. 11 depicts an example wherein the experience of augmented reality (AR) objects is visually enhanced by adjustment of bend angle between the flaps of the device, according to various embodiments of the disclosure.

Referring to FIG. 11, by adjusting the bend angle between the flaps (labeled as F1 and F2), the FoVs of the cameras in the flaps can be increased. According to various embodiments of the disclosure, the AR object can be an emoticon (emoji). The device 400 allow seamless transfer of the emoticon (labeled as 'E') from display of F1 to display of F2. According to various embodiments of the disclosure, the device 400 may display the emoticon simultaneously in F1 and F2. The device 400 can visualize same or different AR effects on the emoticon displayed on the displays of F1 and F2, and perform better surface scanning in AR space and a detailed rendering of the emoticon.

Figure 12:
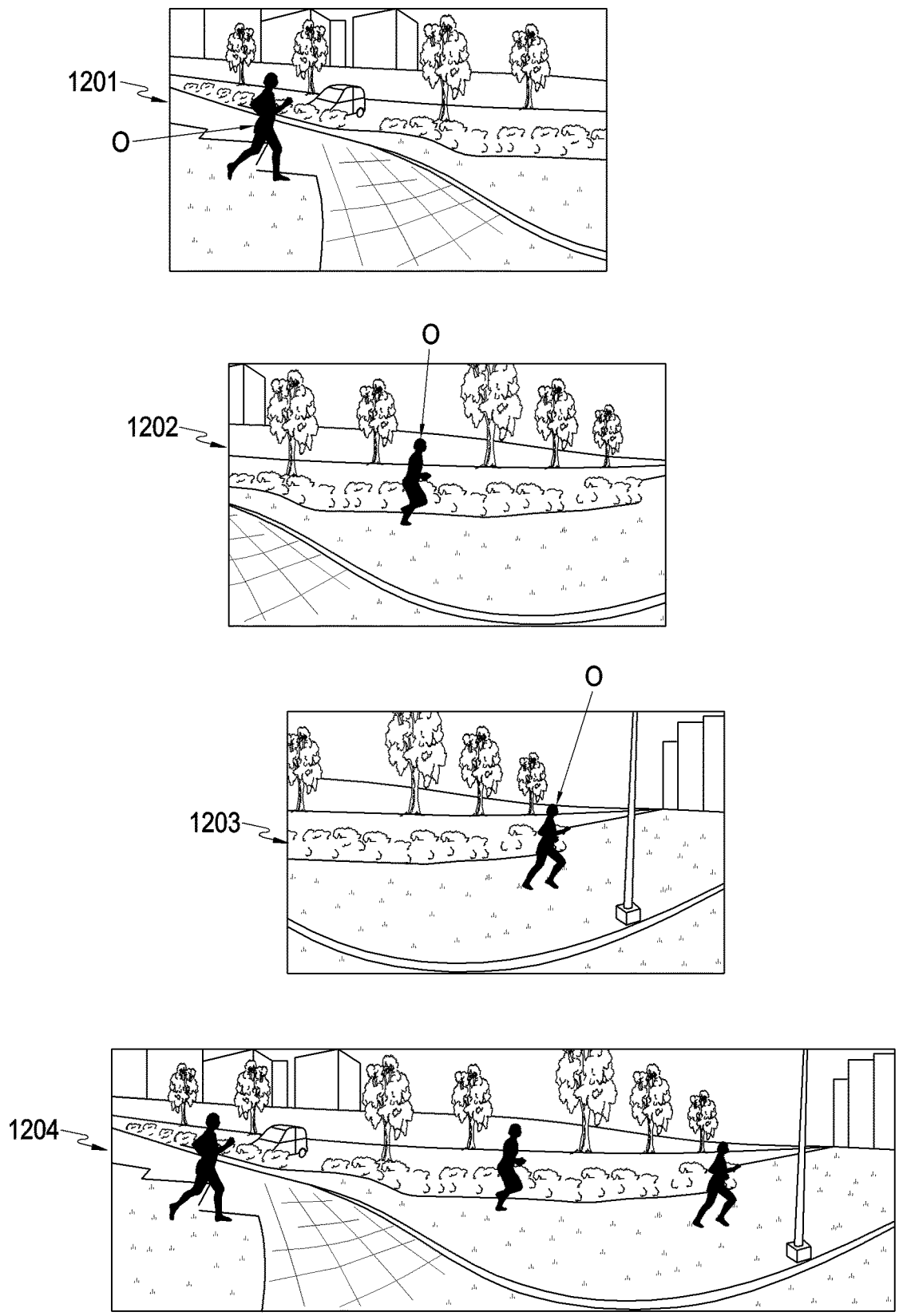
FIG. 12 depicts an example where a cinematic shot is captured and an object is tracked without registration error and blurring of the background, according to various embodiments of the disclosure.

FIG. 12 depicts an example where a cinematic shot is captured and an object is tracked without registration error and blurring of the background, according to the related art. According to various embodiments of the disclosure, the device 400 can automatically identify that the media capture modes having been configured in camera are a cinematic shot and object tracking. The media capture modes can be identified based on a user input indicating selection of either cinematic shot or object tracking. A plurality of suitable baseline distances may be determined by adjusting the bend angle of the flaps of the device 400. A plurality of shots 1201, 1202, and 1203 can be captured at the plurality of suitable baseline distances, respectively. The device 400 can obtain a cinematic shot 1204 by merging the captured shots 1201, 1202, and 1203.

Referring to FIG. 12, since the cinematic shot 1204 is generated from the plurality of shots 1201, 1202, and 1203 captured at the plurality of suitable baseline distances, respectively, background blurring and registration error does not occur in the cinematic shot 1204.

According to various embodiments of the disclosure, when an object (labeled as O) to be tracked is detected, the bend angle between flaps can be adjusted automatically using electronically controlled hinge mechanism, gyro angle based estimation, and so on. The adjustment of the bend angle can aid in determining the suitable baseline distances.

The embodiments disclosed in the disclosure can be implemented through at least one software program running on at least one hardware device and performing network management functions to control the network elements. The network elements shown in FIG. 4 include blocks which can be at least one of a hardware device, or a combination of hardware device and software module.

The embodiments disclosed in the disclosure include a method and a system. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. A method according to various embodiments of the disclosure is implemented in a software program written in e.g. very high speed integrated circuit hardware description language (VHDL) another programming language, or implemented by one or more VHDL or several software modules being executed on at least one hardware device. The hardware device can be any kind of portable device that can be programmed. A device according to various embodiments of the disclosure may also include means which could be e.g. hardware means like an application-specific integrated circuit (ASIC), or a combination of hardware and software means, e.g. an ASIC and a field programmable gate array (FPGA), or at least one microprocessor and at least one memory with software modules located therein. Embodiments described herein could be implemented partly in hardware and partly in software. Alternatively, the disclosure may be implemented on different hardware devices, e.g., using a plurality of central processing units (CPUs).

The foregoing description of the specific embodiments will so fully reveal the general nature of the embodiments of the disclosure that others can, by applying current knowledge, readily modify and/or adapt for various applications such specific embodiments without departing from the generic concept, and, therefore, such adaptations and modifications should and are intended to be comprehended within the meaning and range of equivalents of embodiments of the disclosure. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for capturing media by a device including a plurality of flaps, wherein at least two flaps among the plurality of flaps each include at least one camera, the method comprising:
    analyzing preview images of the cameras, based on a first capture mode;
    adjusting a bend angle between the at least two flaps based on the analyzing of the preview images of the cameras to determine at least one baseline distance; and
    obtaining at least one media in the first capture mode based on the at least one baseline distance.

2. The method of claim 1, further comprising analyzing the preview images of the cameras based on an initial bend angle between the cameras.

3. The method of claim 1, further comprising automatically adjusting the bend angle.

4. The method of claim 1, further comprising identifying the first capture mode based on the analyzing of the preview images of the cameras.

5. The method of claim 4, wherein the first capture mode is identified based on a user input selecting the first capture mode.

6. The method of claim 1, wherein the analyzing of the preview images of the cameras comprises at least one of detecting salient objects, detecting objects at different depths, performing facial detection, detecting at least one moving object, performing pose estimation, determining depths and disparities of the detected objects, or determining registration errors.

7. The method of claim 1, wherein the determining of the at least one baseline distance comprises:
    computing an error metric for the first capture mode based on the analyzing of the preview images;
    adjusting the bend angle to a first angle by changing a position of a first flap among the at least two flaps;
    analyzing the preview images of the cameras at a first baseline distance according to the first angle; and
    determining whether the error metric for the first capture mode is nullified, based on the analyzed preview images at the first baseline distance.

8. The method of claim 7, further comprising, in response to determining that the error metric for the first capture mode is nullified, determining the first baseline distance as a baseline distance corresponding to the first capture mode.

9. The method of claim 7, further comprising:
    adjusting the bend angle to a second bend angle in response to determining that the error metric for the first capture mode is not nullified;
    analyzing the preview images of the cameras at a second baseline distance according to the second bend angle;
    determining whether the error metric for the first capture mode is nullified, based on the analyzed preview images at the second baseline distance; and
    determining, as a baseline distance corresponding to the first capture mode, the second baseline distance at which the error metric for the first capture mode is nullified.

10. The method of claim 1, further comprising, when a user selects one of a displayed plurality of buttons, adjusting the bend angle to correspond to the selected button, and align the cameras to a particular angle at which the cameras can capture the media.

11. The method of claim 1, further comprising displaying a current bend angle or a range in which the current bend angle lies, in response to a particular user input.

12. A device for capturing media, the device comprising:
a plurality of flaps, wherein at least two flaps among the plurality of flaps each include at least one camera; and
a processor configured to:
analyze preview images of the cameras, based on a first media capture mode,
adjust a bend angle between the at least two flaps based on the analyzing of the preview images of the cameras to determine at least one baseline distance, and
obtain at least one media in the first capture mode based on the at least one baseline distance.

13. The device of claim 12, wherein the processor is further configured to analyze the preview images of the cameras based on a baseline distance according to an initial bend angle between the cameras.

14. The device of claim 12, further comprising a flap control unit for adjusting the bend angle.

15. The device of claim 12, wherein the processor is further configured to automatically identify the first capture mode based on the analyzing of the preview images of the cameras.

16. The device of claim 12, further comprising a user input selection unit for receiving a user input selecting the first capture mode.

17. The device of claim 12, wherein, when the processor analyzes the preview images, the processor is further configured to detect salient objects, detect objects at different depths, perform facial detection, detect at least one object undergoing motion, perform pose estimation, determine depths and disparities of the detected objects, or determine registration errors.

18. The device of claim 12, wherein the processor is further configured to:
compute an error metric for the first capture mode based on the analyzing of the preview images of the cameras;
adjust the bend angle to a first angle by changing a position of a first flap among the at least two flaps;
analyze the preview images of the cameras at a first baseline distance according to the first angle; and
determine whether the error metric for the first capture mode is nullified, based on the analyzed preview images at the first baseline distance.

19. The device of claim 18, wherein, in response to determining that the error metric for the first capture mode is nullified, the processor is further configured to determine the first baseline distance as a baseline distance corresponding to the first capture mode.

20. The device of claim 18, wherein the processor is further configured to:
adjust the bend angle to a second bend angle in response to determining that the error metric for the first capture mode is not nullified;
analyze the preview images of the cameras at a second baseline distance according to the second bend angle;
determine whether the error metric for the first capture mode is nullified, based on the analyzed preview images at the second baseline distance; and
determine, as a baseline distance corresponding to the first capture mode, the second baseline distance at which the error metric for the first capture mode is nullified.

* * * * *